United States Patent [19]

Yazaki et al.

[11] 3,886,568
[45] May 27, 1975

[54] PHOTOGRAPHIC CAMERA WITH AUTOMATIC EXPOSURE CONTROL MEANS

[75] Inventors: Mutsunobu Yazaki, Yokohama; Yukio Mashimo, Tokyo; Mutsuhide Matsuda, Yokohama, all of Japan

[73] Assignee: Canon Kabushiki Kaisha, Tokyo, Japan

[22] Filed: Nov. 15, 1973

[21] Appl. No.: 416,214

Related U.S. Application Data

[63] Continuation of Ser. No. 272,979, July 18, 1972, abandoned.

[30] Foreign Application Priority Data

July 23, 1971 Japan .............................. 46-55517

[52] U.S. Cl. ................. 354/27; 354/139; 354/149
[51] Int. Cl. .......................................... G03b 7/16
[58] Field of Search ............ 354/27, 127, 128, 149, 354/139

[56] References Cited
UNITED STATES PATENTS

| 3,526,182 | 9/1970 | Engelsmann et al. | 95/60 |
| 3,563,141 | 2/1971 | Starp | 95/10 |
| 3,611,895 | 10/1971 | Albedyll et al. | 95/10 C |

*Primary Examiner*—Samuel S. Matthews
*Assistant Examiner*—Russell E. Adams, Jr.
*Attorney, Agent, or Firm*—William R. Woodward, Flynn & Frishauf

[57] ABSTRACT

A camera is operated with manual setting of the aperture for normal photography, while the exposure time is controlled by a photoelectric cell which also controls a meter which indicates the exposure time in the viewfinder. Manipulation of a ring on the lens tube transfers the operation to flash photography. In usual flash photography a variable resistor adjusted by the focussing of the lens determines the position of the meter movement, which both shows the indication of the aperture in the viewfinder and controls the aperture setting. In another kind of flash photography, where an appreciable amount of daylight is to be taken account of, the shutter timing, instead of being fixed as in usual flash photography, is controlled by a light measurement, although the aperture is controlled by the focus distance. The change over from normal to flash causes the scales in the viewfinder to be changed, either mechanically or optically.

7 Claims, 7 Drawing Figures

Patented May 27, 1975

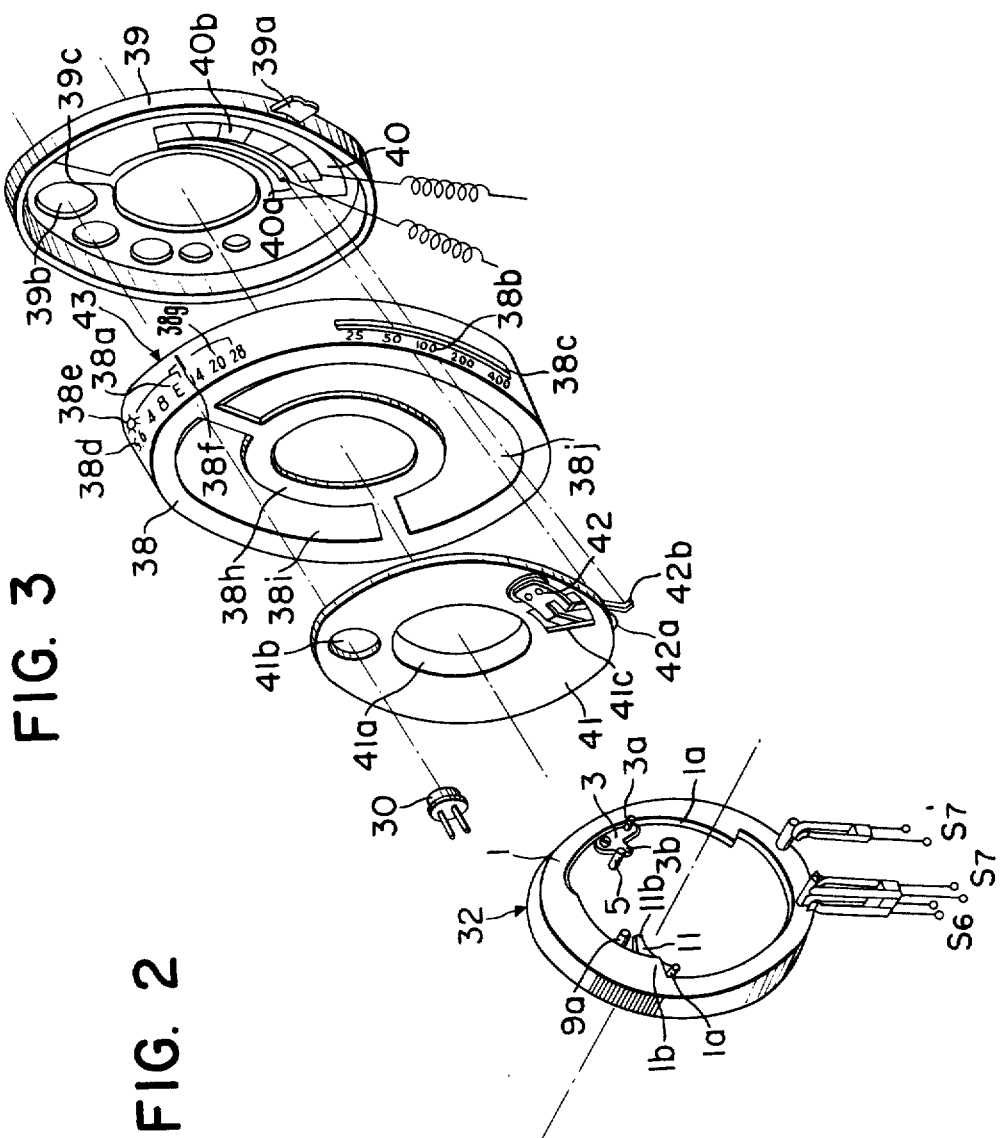

PHOTOGRAPHIC CAMERA WITH AUTOMATIC EXPOSURE CONTROL MEANS

This is a continuation, of application Ser. No. 272,979, filed July 18, 1972, now abandoned.

BACKGROUND OF THE INVENTION

1. Field of the Invention

This invention relates to a photographic camera with an automatic exposure control device, and more particularly to a photographic camera which is capable of daylight photography and flash photography.

2. Description of the Prior Art

There is known an electronic shutter control circuit for controlling shutter time by means of a time constant circuit comprising a light receiving element such as a photoconductive element for metering the brightness of an object to be photographed and a time limiting capacitor. Such shutter control circuit can automatically adjust a wide range of shutter speed for the range of brightness of the object to which the light receiving element is responsive, but if the brightness of the object is low there would occur a long exposure during which hand vibrations of camera or reduced metering precision of the light receiving element would arise to produce an exposure error, thus resulting in an inaccurate shutter speed and out-of-focus image.

It is therefore desirable to effect flash photography by using an auxiliary light source such as flash unit or electronic strobe to illuminate an object. However, the electronic shutter control circuit can not adjust aperture control means, although it can vary the camera's shutter speed. Consequently, it has been impossible to adjust the opening of the camera's aperture means in accordance with the object distance while illuminating the object with the auxiliary light.

In order that a camera having an electronic shutter control circuit may also be capable of performing flash photography, the camera's aperture means has been required to incorporate therein a separate control means which is responsive to the adjustment of object distance to vary the opening of the aperture means. This has led to complexity of the camera's construction and accordingly to a higher cost.

SUMMARY OF THE INVENTION

It is the object of the present invention to overcome the above-noted disadvantages existing in the prior art and to control an electronic shutter time control circuit by utilizing a light receiving element for metering the brightness of an object and to indicate shutter time by means of an electric rotary machine such as meter or the like, which may be rotated in accordance with the object distance during flash photography so that the amount of such rotation may adjust the camera's aperture opening, thus selectively adjusting the shutter time and the aperture opening.

A feature of the present invention lies in that the values of shutter time and aperture opening may be selectively indicated by a common electric rotary machine and that when flash photography is chosen aperture means may be adjusted in accordance with an indicated value of the aperture opening.

More specifically, the present invention provides a camera which is well suited for various types of photography such as daylight synchro photography, shallow-depth photography, hand-vibration-free photography and the like and useful to increase the so-called proper exposure (EE) range, by using an ammeter as means for indicating shutter time during natural light photography and also as aperture opening output means during flash photography.

BREIF DESCRIPTION OF THE DRAWINGS

The invention will become fully apparent from the following detailed description thereof taken in conjunction with the accompanying drawings, in which:

FIG. 2 shows a partial view of the camera when the change-over ring of FIG. 1 is set to flash EE photography;

FIG. 3 shows the essential parts of a camera having a modified construction of the change-over rings and the like;

Figure 1:
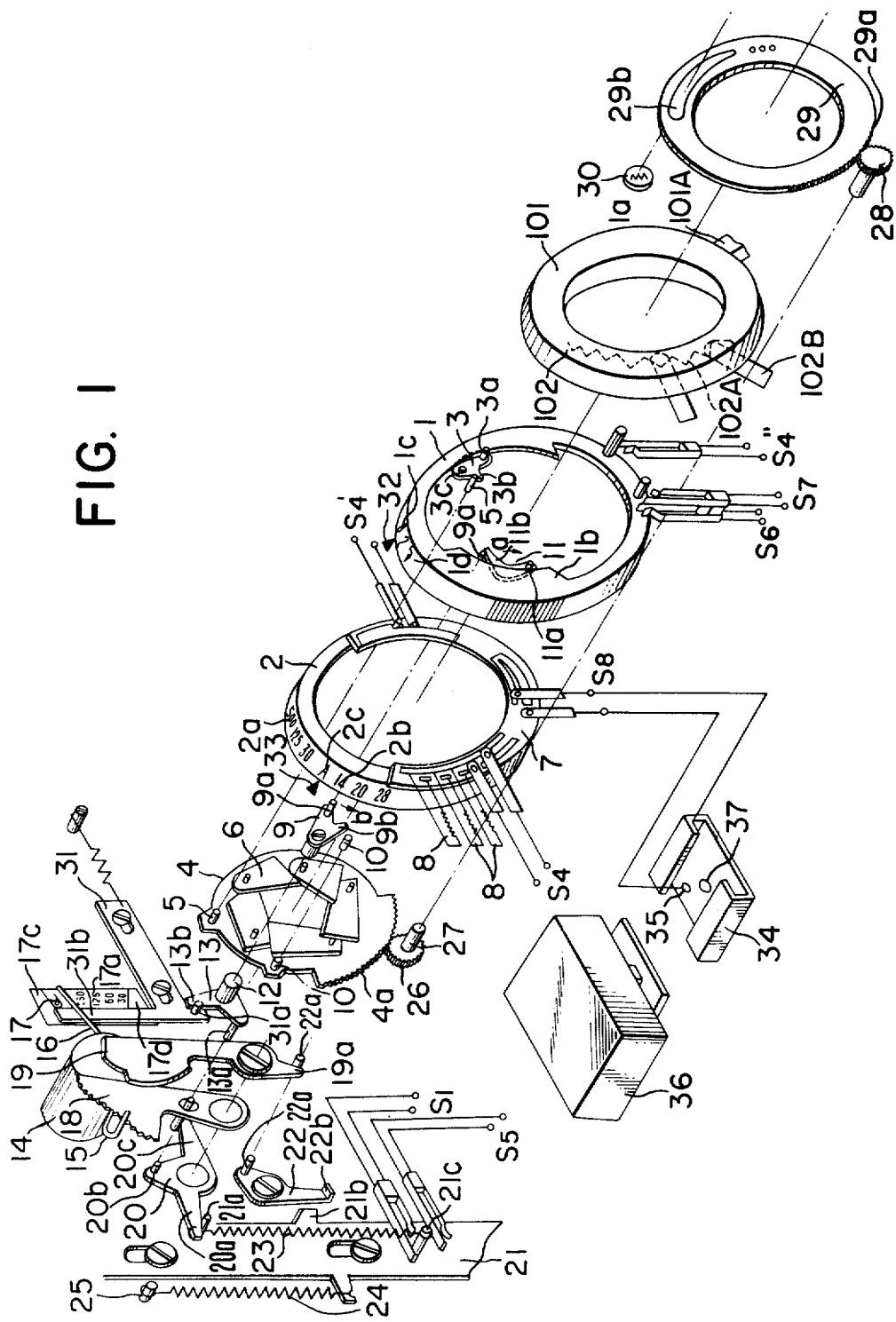
FIG. 1 shows the essential parts of the camera according to the present invention when set to aperture preference EE photography.
Figure 4:
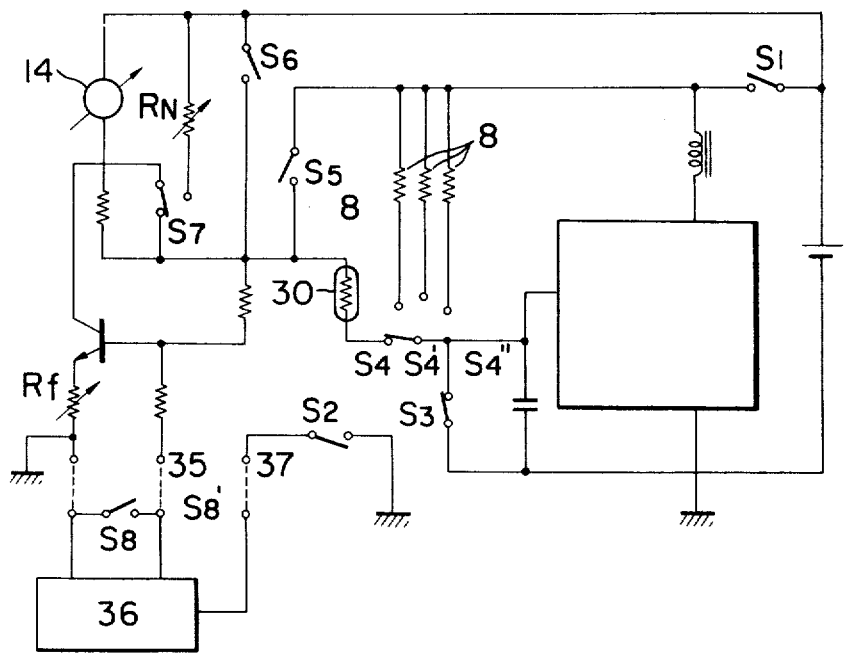
Figure 5:
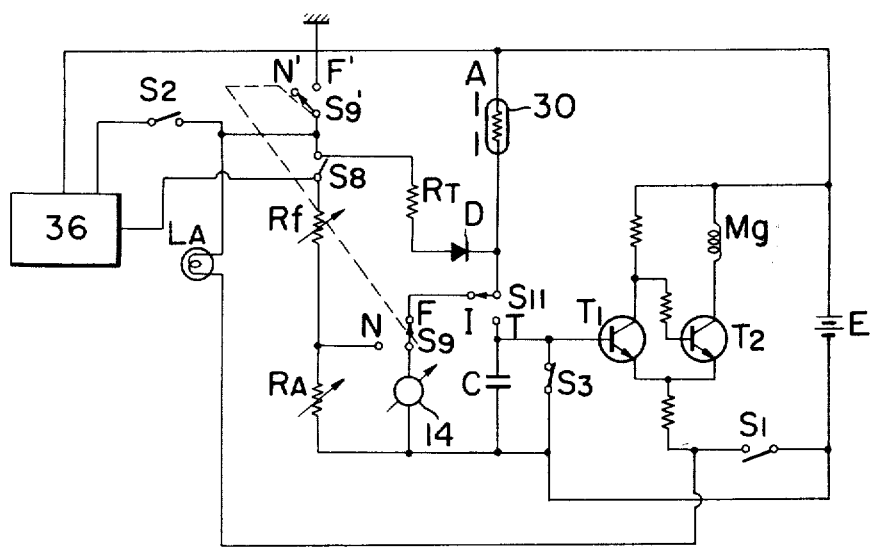
Figure 6:
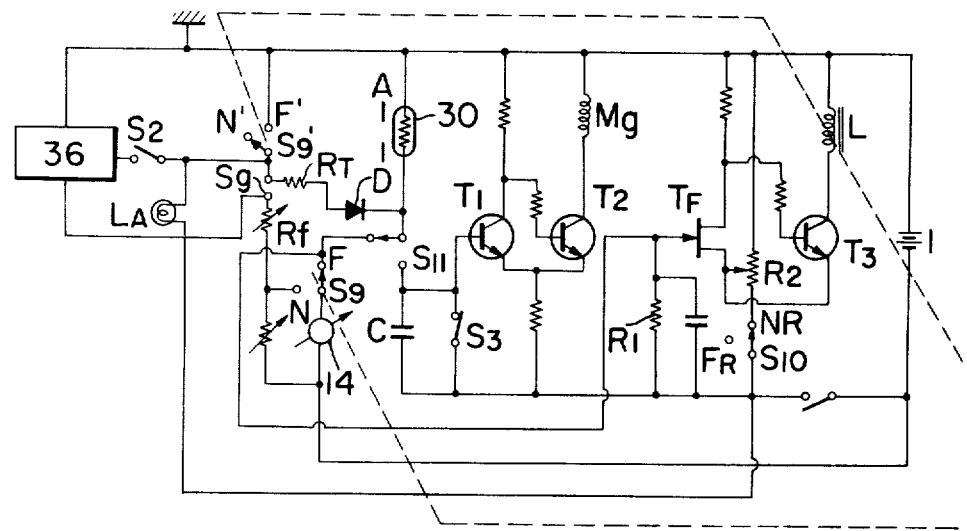

FIG. 4 diagrammatically shows an example of the electric circuit applicable to the camera shown in FIGS. 1 and 2;

FIG. 5 diagrammatically shows a modification of the electric circuit which includes flash EE signal indicator means;

FIG. 6 diagrammatically shows an example of the electric circuit with which change-over between natural light EE photography and flash EE photography may be automatically done in accordance with the brightness of an object to be photographed; and FIGS. 7 to 10 illustrate the essential parts of the arrangement for indicating exposure factor and the like within the viewfinder of the camera.

DESCRIPTION OF THE PREFERRED EMBODIMENT

Referring to FIG. 1, a change-over ring 1 for flash EE photography is rotatably mounted on the camera's unshown lens tube and it also serves as a manual aperture setting member. The ring 1 is formed with cams 1a, 1b, and F-numbers 1c and flash EE mark (S) 1d which may be manually set. A change-over ring 2 for natural light stop-down preference EE photography (automatic daylight exposure photography) is mounted on the lens tube in juxtaposed relationship with the ring 1 and also serves as manual shutter time setting member and as guide number setting member. The ring 2 carries on the periphery thereof shutter speed values 2a, guide numbers 2b and natural light stop-down EE mark (A) 2c which may all be manually set. A manual stop-down lever 3 s pivotally mounted on a pin 3c studded in the fixed frame of unshown lens tube. The lever 3 has a pin 3a provided at one end thereof for engagement with the cam 1a on the change-over ring 1 and normally biased into engagement with the cam 1a by unshown spring. Formed at the other end of the manual stop-down lever 3 is an arm 3b engaged with a pin 5 provided on an aperture ring 4. A plurality of diaphragm blades 6 is movable with the rotation of the aperture ring 4 so as to determine the aperture opening. A switching printed plate 7 is provided on the change-over ring 2 and adapted to suitably close and open switches S4, S4' and S8 upon rotation of the change-over ring 2. A fixed resistor 8 is provided for manual shutter time setting, and an automatic stop-down lever 9 is pivotally mounted and has a pin 9a at one end thereof and an arm 9b at the other end for engagement with a pin 10 provided on the aperture ring 4. A pivotable lever 11 for determining the angle of rotation of the automatic stop-down lever 9 has a pin 11a at one end for engagement with the cam 1b and an arm 11b at the other end for engagement with the pin 9a. The automatic stop-down lever 9 is pivotally mounted on a shaft 12, which carries an intermediate lever 13 at the end thereof which is remote from the lever 9. The intermediate lever 13 is formed with a pin 13a engageable with the arm 20c of a diaphragm drive lever 20 which will be described further. A meter 14, provided in unshown camera body, has a clamp needle 15 and a viewfinder needle 16. A film indicator plate 17 forms a part of the viewfinder and is provided with shutter time indications 17b and warning marks 17c, 17d. A stepped cam 18 is provided to determine the aperture opening in response to displacement of the meter 14 and cooperates with a diaphragm drive lever 20 through a pin 20b studded therein. A clamp plate 19 for clamping the clamp needle 15 has an arm 19a at one end for engagement with a pin 22a on a lock lever 22 adapted to lock an unshown shutter button. The diaphragm drive lever 20 also has an arm 20a in addition to the aforesaid arm 20c and pin 20b. A release plate 21 is associated with the shutter button so as to be slidable in response thereto. A pin 21a is formed on the release plate 21 and engageable with the arm 20a of the diaphragm drive lever 20. A stepped portion 21b is also formed on the release plate 21 and engageable with the arm 22b of the lock lever 22 to thereby lock the release plate 21 and accordingly the shutter button. Thus no picture-taking can take place outside the flash EE interlocking range when no proper exposure is provided. A switching pin 21c is formed on the release plate 21 to close and open switches S1 and S5. A spring 23 is provided to cause the diaphragm drive lever 20 to cooperate with the release plate 21, and a return spring 24 for the release plate 21 has one end secured to a fixed pin 25. A gear 26 is provided to drive an aperture plate 29 for a photoconductive element 30 which will be described, and this gear is in meshing engagement with a sector gear 4a on the aperture ring 4. The gear 26 is rotatably mounted on a shaft 27, which securely carries a gear 28 at the end thereof which is remote from the gear 26, so that the gears 26 and 28 cooperate with each other. The aperture plate 29 for the photoconductive element 30 is formed with a gear 29a and an aperture opening 29b. A slide lever 31 is provided to change over the indication of film indicator plate 17 within the viewfinder and is formed with an arm 31a engageable with the arm 13b of the intermediate lever 13, and an arm 31b for changing over the indication of the film indicator plate 17 to the shutter time indication 17a or to the F-number indication 17b. An index mark 32 for the change-over ring 1 and an index mark 33 for the change-over ring 2 are provided respectively. An accessory shoe 34 is grounded with the camera body. The accessory shoe 34 has a contact 35 in series with a change-over switch S8' for flash unit so as to detect the type of the flash unit inserted in the shoe 34 in accordance with the presence or absence of a signal contact in the flash unit. Thus, when flash unit 36 having a signal contact is inserted into the shoe 34, the contact 35 may be connected with the contact of the flash unit 36 to close the switch S8' shown in FIG. 4. By changing over the change-over ring 2 to close the switch S8 as shown in FIG. 1, the flash unit 36 and the camera may be operatively associated together so that the camera is ready for flash. The shoe 34 also has a contact 37 for operatively associating the camera with synchro means, which contact 37 may be connected with a corresponding contact on the flash unit 36 to thereby permit synchro photography. Means such as the so-called synchro contact and shutter mechanism are not shown in FIG. 1. Where no automatic discrimination is effected between an ordinary flash unit and the flash unit 36, means such as manual change-over switch may additionally be provided on the camera to effect such discrimination. In this case, a two-terminal connection may be accomplished between the camera and the flash unit.

A distance adjusting ring 101 is mounted on the unshown lens tube and operable by means of a rotatable operating member 101A to adjust an unshown focusing lens to the distance of an object to be photographed. The ring 101 is provided with a resistance element 102 and slides 102A and 102B forming a distance resistor Rf which will be described later.

FIG. 1 has shown the case of natural light EE photography, but when the mode is changed over to the flash EE photography as shown in FIG. 2, the F-number indication 17b will appear in the viewfinder. In such a case, the slide lever 31 which has previously shielded the F-number indication 17b will now shield the shutter time indication 17a. Switches S6, S7, S4'', etc. are changed over by means of the change-over ring 1.

FIG. 3 shows a second embodiment of the present invention which employs a change-over ring 38 instead of the change-over rings 1 and 2. The change-over ring 38 is provided with daylight synchro mark 38a, film sensitivity indication 38b, elongated slot 38c, F-number indication 38d, natural light EE mark 38e, flash EE mark 38f, guide number indication 38g, circular hold 38h, sector holes 38i and 38j. A film sensitivity change-over addition plate 39 and a fixed plate 41 are disposed with the change-over ring 38 interposed therebetween so as to permit light from an object to enter a photoconductive element 30 and film disposed behind the ring and plates. The change-over addition plate 39 is formed with a change-over knob 39a to be inserted into the elongated slot 38c of the change-over ring 38, openings 39b for controlling the quantity of light incident on the photoconductive element, and a circular hole 39c. A printed circuit member 40 having a printed conductor surface 40a and a printed resistance surface 40b is attached to the change-over addition plate 39 at a predetermined location thereof. The fixed plate 41 is formed with circular openings 41a, 41b and a sector opening 41c, and a contact plate 42 is attached to the fixed plate 41 at a predetermined location thereof and in electrically insulated relationship therewith. The contact plate 42 is provided with contacts 42a and 42b which are resiliently connected with the corresponding printed conductor surface 40a and printed resistance surface 40b of the printed plate 40, respectively. Thus, when the film sensitivity indication 38b is set by means of change-over knob 39a, there may be formed a resistance circuit corresponding to the set value and also the light from an object may pass to the photoconductive element 30 through one of the openings 39b corresponding to the set value. Thereupon, the change-over addition plate 39 may be changed over with respect to the change-over ring 38 and moreover, the change-over addition plate 39 is rotatable with the change-over rotation of the change-over ring 39. Switches S6, S7, and S8 are interposed between the fixed plate 41 and the change-over ring 38. These switches S6, S7 and S8 are arranged so that all of them are open for the natural light stop-down preference EE mode when the F-number indication 38d is set to the fixed index mark 43 and that the switches S6 and S7 are closed but the switch S8 is open to function as flash stop-down preference EE shutter when the E mark 38a is set to the fixed index mark 43. This is useful for the so-called daylight synchro photography. When the guide number indication 39g is set to the fixed index mark, the switches S6, S7 and S8 are all closed to permit flash EE photography to be effected by using an ordinary flash unit.

FIG. 4 shows an electric circuit applicable in the construction of FIG. 1. In the circuit, S1 is a main switch for shutter control circuit and adapted to close and open in response to the movement of the release plate 21 associated with the shutter button, and S2 is a synchro switch synchronized with the shutter means to trigger the flash unit 36. S3 is a shutter start switch normally closed to form a meter drive circuit and adapted to close, open and close in response to the movement of shutter blades when released. S4 is a switch adapted to close and open in response to the movement of change-over rings 1 and 2, and together with switches S4' and S4'' as shown in FIG. 1, this switch S4 is adapted to close so as to form a circuit passing through the photoconductive element 30 and a circuit passing through the fixed resistor 8 for 1/30 sec. during the setting to the A mark 2c. During the photography with the manual shutter time setting, the circuit passing through the the photoconductive element 30 is opened and the meter circuit is also opened but only the circuit passing through a particular fixed resistor corresponding to the set-up shutter time is closed. Switch S5 is adapted to close and open in response to the movement of the release plate 21 associated with the shutter button. Closing of the switch S5 short-circuits the meter circuit to prevent it from affecting the shutter time during the shutter time determination. Switch S6 is adapted to close and open in response to the movement of the change-over ring 1. When the ring 1 is set to the flash EE mark 38f, the switch S6 is closed to form a flash EE circuit. Switch S7 is also associated with the change-over ring 1 so that the fixed resistor 8 and film sensitivity resistor RN are connected in the circuit during flash photography. Although the control mechanism for the resistor RN is not shown in FIG. 1, it should be understood that some suitable control means is necessary for this resistor. Alternatively, the arrangement as shown in FIG. 3 may be adopted. S8 is a switch associated with the change-over ring 2 and adapted to close to accomplish ordinary flash photography when the ring 2 is changed over to indicate the guide number of ordinary flash unit. In such a case, switch S8' is opened. When the aforesaid flash unit 36 is attached to the accessory shoe 34, switch S8' is closed and switch S8 is opened. Distance resistor Rf may be set in accordance with the object distance.

The operation of the camera according to an embodiment of the present invention will now be described with reference to FIGS. 1, 3 and 4.

For natural light stop-down preference EE photography, the A mark 2a of the change-over ring 2 is registered with the index mark 33 and the manual F-number 1c is set to the index mark 32, as shown in FIG. 1. In accordance with the F-number thus set up, the cam 1a of the change-over ring 1 is engaged with the pin 3a to pivotally move the manual stop-down lever 3, whose movement is transmitted from the gear 4a on the aperture ring 4 through the gear 26, shaft 27 and gear 28 to the gear 29a on the aperture plate 29 for the photoconductive element 30, to thereby determine the metering opening 29b corresponding to the predetermined F-number. When the F-number of the photoconductive element 30 has been so determined, a current flowing to the meter 14 through the meter drive circuit of FIG. 4 is determined in accordance with the brightness of the object to be photographed, whereupon the rotary system of the meter 14 is rotated so that the shutter time value for EE photography is indicated within the viewfinder by the needle 16 and film indicator plate 17. Thus, an appropriate value of shutter time can be predicted although the shutter time is actually determined by the time constant circuit as shown in FIG. 4.

If use is made of an aperture setting method comprising rotating an aperture ring so that the meter indicates a desired shutter time, preference may be given to the determination of shutter time.

When the aperture ring 1 is set within the manual stop-down range, the pivotable lever 11 is caused by the cam 1b to engage the pin 9a on the automatic stop-down lever 9 to thereby lock this lever.

Upon depression of unshown shutter button, the release plate 21 slides down so that the diaphragm drive lever 20 is rotated only for a slight angle by the spring 23 until the lever 20 is locked by the pivotable lever 11 through the intermediate lever 13 and automatic stop-down lever 9, whereby the clamp plate 19 locks the clamp needle 15. Also, the switch S1 is then closed to make the shutter time determining circuit ready for operation. Further depression of the release plate 21 closes the switch S5 to short-circuit the meter circuit but the clamp needle remains locked by the clamp plate 19.

At the final stroke of the slide plate 21, unshown shutter means is released to start the shutter opening operation and open the start switch S3, and after a time determined by the time-constant circuit comprising the photoconductive element 30 and capacitor, a magnet is deenergized to effect the shutter closing operation, thus completing a predetermined time of exposure.

For flash photography, the change-over ring 1 is changed over from the manual aperture setting range to the mark 1d so that the manual stop-down lever 3 is set to a position corresponding to the maximum diameter of the cam 1a. Since the pin 11a is brought into contact with the outer cam by the rotation of the cam 1b, the pivotable lever 11 is rotated by an unshown spring until it is disengaged from the pin 9a of the automatic stop-down lever 9, and at the same time the switches S6 and S4' are closed to change over the switch S7 to the flash photography circuit.

Where the flash unit 36 is used, the change-over ring 2 may remain set to the A mark. In this case, when the flash unit 36 is attached to the camera's accessory shoe 34, the contact 35 is connected with the flash unit 36 to close the switch S8', whereby a voltage or current corresponding to the flash voltage of the flash unit 36 is applied between the shoe 34 as grounding terminal and the contact 35 to control the output of the meter drive circuit in the camera. In such case, the distance resistor Rf inserted in the meter circuit and determined by setting the object distance determines the value of the current flowing to the meter 14 so that the rotary system of the meter 14 indicates a predetermined F-number as the result of the rotation and the clamp needle integral therewith is also set and maintained at the same F-number.

Subsequently, depression of unshown shutter button causes the release plate 21 to slide down against the force of the spring 25. At a first stage of such depression, the diaphragm drive lever 20 is rotated by the spring 23 and the clamp needle 15 is clamped by the clamp plate 19. At a second stage of depression, the diaphragm drive lever 20 can be further rotated by the spring 23 because of the disengagement between the automatic stop-down lever 9 and the pivotable lever 11 until the stepped cam 18 is stopped by the clamp needle 15. The arm 20b of the diaphragm drive lever 20 causes the pin 13a to rotate the automatic stop-down lever 13 in the direction of arrow b. With this movement, the arm 9b is engaged with the pin 10 on the aperture ring 4 to rotate this ring to a predetermined position, thus determining the aperture diameter. In this case again, such movement is transmitted from the gear 4a on the aperture ring 4 through the gears 26, 28, 29a to determine the diameter of the metering opening 29b in front of the photoconductive element 30. Also, the rotation of the automatic stop-down lever 13 causes the slide plate 31 to be slid by an unshown spring via the arm 13b and pin 31a so as to cover the shutter time indication 17b so that the latter may be visually perceived.

Should the object distance then be outside the interlocking range of the flash unit to prevent a proper exposure, the clamp plate 19 will effect a greater angle of rotation so that the arm 19 and the pin 22a of the lock lever 22 will cause the arm 22b to be engaged with the stepped portion 21b of the release plate 21, thus stopping the sliding movement of the release plate 21 and thereby locking the shutter button automatically.

From this position the shutter means is released in the same manner as described with respect to the natural light EE photography, to accomplish a proper exposure. In this case, the shutter time is electronically determined with preference given to the aperture because the metering opening 29b for the photoconductive element 30 corresponds to the F-number of the picture-taking lens. This is most suitable for the so-called counter-light and flash photography, daylight synchro photography and the like. During the picture-taking, the flash unit 36 is triggered by the synchro switch S2 synchronized with the shutter means to thereby accomplish flash EE photography.

Where an ordinary flash unit is used, the setting of the change-over ring 2 to the guide number indication 2b of the flash unit accompanies the setting of the shutter time to 1/30 sec. and the closing of the switch S8. Again, a proper exposure may be achieved by an operation substantially similar to the case where the flash unit 36 is used, although in this case the flash EE photography is effected by a flash auto-mechanism because the aperture diameter is determined in accordance with the distance resistor Rf. However, when the change-over ring 1 is set to the mark 1d, the aperture diameter is controlled by the flash unit 36 as described previously.

To take a picture at a manually set shutter speed, the change-over ring 2 is set to the shutter time indications 2a, and the circuit passing through the photoconductive element 30 and the meter circuit are opened so that the shutter means is controlled for exposure by the time constant circuit comprising the preset resistor 8 and capacitor.

The circuit of FIG. 4 may be modified into the form as shown in FIG. 5 or 6 and correspondingly, the mechanical construction may be accommodated thereto.

FIG. 5 shows an example of the electric circuit having flash EE signal indicator means. This circuit includes an electric power supply battery E, a main switch S1, switching transistors T1 and T2, a shutter closing magnet Mg, a start switch S3, a photoconductive element 30, a metering aperture means A variable with information of F-number and film sensitivity, a capacitor C forming a time constant circuit, a change-over switch S11 for changing over an exposure indicator circuit and an exposure control circuit, a meter 14, switches S9 and S9' changeable over from natural light EE terminals N and N' to flash EE terminals F and F', respectively, a manually set resistor RT for shutter time (say, 1/30 sec.), a diode D, a resistor RA variable with film sensitivity and guide number, a resistor Rf variable in response to a focal distance setting ring, a switch S8 adapted to open in response to the connection of flash unit 36, and a synchro switch S2. An indicator lamp LA is provided which may be turned on for flash EE photography and turned off for natural light photography and is useful to provide such a design that the contents of the exposure factors indicated in the camera's viewfinder can be changed over from one to another.

When flash EE photography is to be effected by using the circuit arrangement of FIG. 5, the switches S9 and S9' are changed over into connection at terminals F and F' and the switch S1 is closed by a shutter release operation hold the aperture diameter corresponding to the F-number output of the meter 14 by means of saw-teeth or the like. Thereafter, change-over switch S11 is changed over from indicator terminal I to shutter terminal V. Subsequently, switch S3 is opened in response to the shutter opening operation to thereby accomplish a shutter closing operation after a predetermined time corresponding chiefly to the set resistor RT. Such change-over between natural light EE photography and flash EE photography may be accomplished either by the use of two change-over rings as shown in FIGS. 1 and 2 or by the use of a single change-over ring as shown in FIG. 3. Although the camera is usually focused with respect to the object before the shutter button is depressed, but if the interlocking range is departed from, the photographer may move toward or away from the object to provide a proper exposure with the indication maintained.

When natural light EE photography is to be effected by using the circuit arrangement of FIG. 5, switches S9 and S9' are changed over into connection at terminals N and N' as shown. With the shutter unreleased, the meter 14 is connected in series with the photoconductive element 30 and the signal representing the film sensitivity plus the signal representing the aperture opening is applied as input to the metering aperture means A disposed in front of the photoconductive element 30, so that the meter 14 indicates a proper exposure shutter time as the output corresponding to the film sensitivity, the aperture opening and brightness of the object. By introducing the value of such shutter time into the viewfinder so that it may be seen therein, the shutter time for natural light EE photography can be predicted. Prior to the shutter release operation, the main switch S1 is closed to restrain the shutter closing operation by means of magnet Mg, whereafter change-over from the indication to the shutter operation is effected by the switch S11 and shutter means is released to open the shutter. In response thereto, the start switch S3 is opened and a current flows to the magnet Mg to maintain the shutter open until a predetermined shutter time elapses. The shutter is closed after a predetermined shutter time substantially corresponding to the indicated shutter time.

With regard to flash unit 36, the description made above with respect to FIG. 4 holds true again, that is, the synchro switch S2 is closed in response to the shutter operation to accomplish flash EE photography.

Description will now be made briefly with reference to FIG. 6 about the case where the change-over between flash EE mode and natural light EE mode is automatically effected in accodance with the brightness of the object. In FIG. 6, switches S9 and S9' cooperate with a coil L to constitute associated reed switches, and connected with the coil L is the output circuit of a transistor T3 which in turn is connected with a field effect transistor TF responsive to a signal from the point of conection between the photoconductive element 30 and the resistor R1, so that the brightness factor of the object may be automatically varied by adjustment of potentiometer R2. Also, the circuit passing through the potentiometer R2 is open and inoperative during flash EE mode. For example, it should be understood that switch S10 is changed over to terminal FR when flash unit is mounted to the camera and switch S10 is returned to terminal NR when flash unit is removed from the camera. The other points in FIG. 6 are similar to those shown in FIG. 5 and need not be described further.

Figure 7:
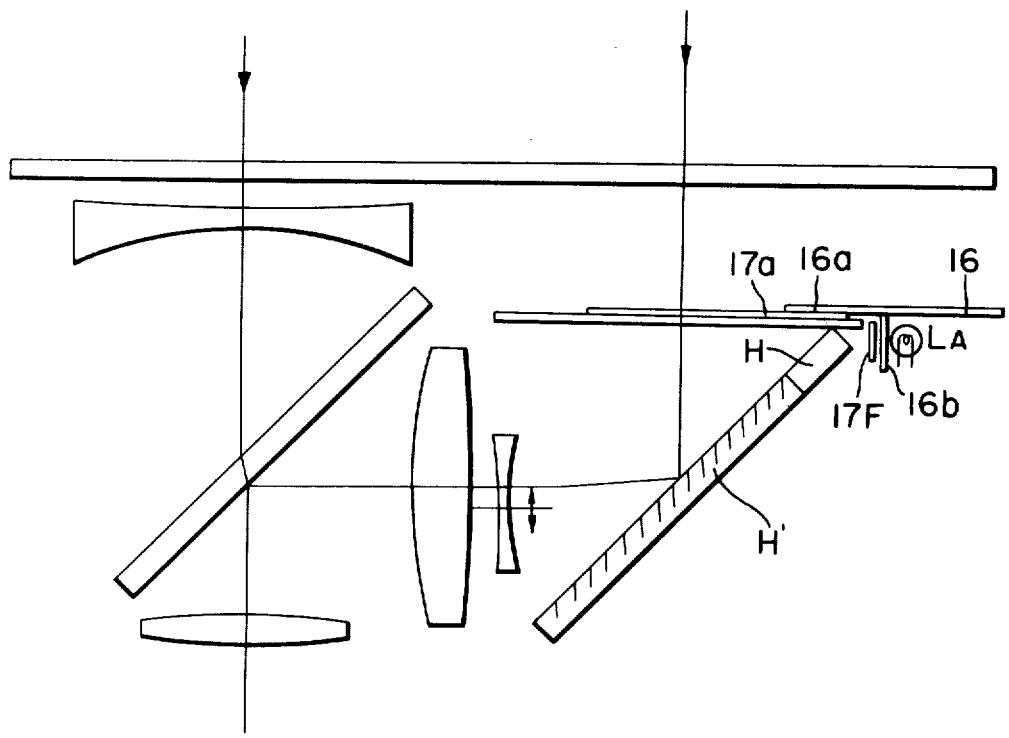
Figure 8:
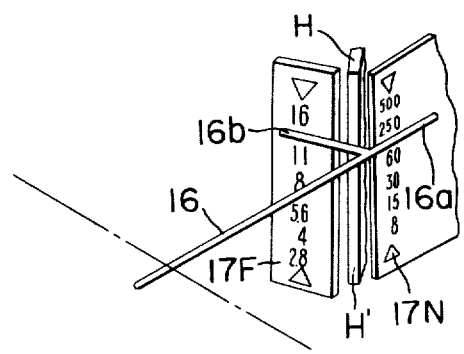

FIG. 7 shows the construction of viewfinder for use with the circuit arrangement as shown in FIG. 5 or 6 wherein, for flash EE photography, a flash EE signal may be electro-optically converted and introduced into the finder field or to the neighborhood thereof, and for natural light photography, the shutter time may be indicated by the natural light passing through the finder and wherein, for flash photography, the aperture opening may be indicated by the electro-optically converted lamp output through a half-mirror and a common ammeter may be used to indicate both the shutter time and the aperture opening within a common indicator window.

In such a case, the mechanical indication change-over means as shown in FIGS. 1 and 2 may be omitted. In case of FIG. 6, the magnet Mg may be utilized to change over the mechanical indication change-over means.

In FIG. 7, a lamp may indicate the flash-ready condition for flash EE photography and the needle 16 has needle ends 16a and 16b integrally formed therewith for indicating the shutter time and F-number, respectively. Film indicator plates 17N and 17F are provided with shutter time indications 17a, 17b and warning marks 17c, 17d, respectively. A half-mirror H is fixedly attached to one end of a total reflecting mirror H' forming a so-called range finder interlocked mark finder. It should be understood that the indicator plate 17N and 17F are disposed in optically conjugate relationship with the half-mirror H (see FIG. 8).

Figure 9:
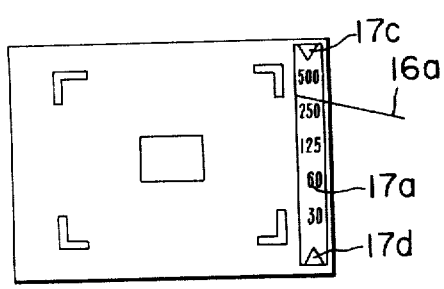
Figure 10:
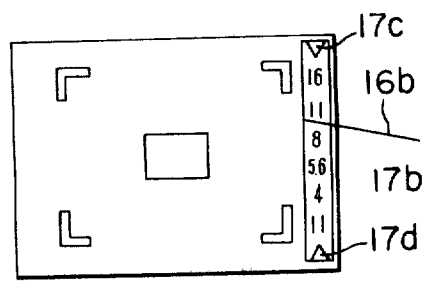

When the mark finder of the described construction is employed, the shutter time indication 17a and the needle end 16a may be visually perceived in the finder with the aid of natural light and the F-number indication 17b and the needle end 16b may be visually perceived in the finder with the aid of lamp light. FIG. 9 shows the case of natural light EE photography which permits the former perception, and FIG. 10 shows the case of flash EE photography which permits the latter perception.

In the circuit of FIGS. 5 or 6 wherein the main switch S1 has been described as being associated with shutter button, the above-described indications take place at the first stage of shutter button depression, but alternatively the switch S1 may be constructed and arranged so that the indications may take place at all times.

The present invention, as has been described with respect to various embodiments thereof, relates to a camera in which an electric rotary machine driven by a drive circuit produces a shutter time signal as output during natural light photography and produces an aperture opening signal as output during flash photography, and therefore the invention is not limited in application to the aperture preference type natural light EE photographic system, the focal distance preference and aperture control type flash EE photographic system and the daylight synchro EE photographic system with preference given to the controlled aperture, but the invention may also be constructed to employ the shutter preference type or the programmed shutter type (or possibly the half-open shutter type) for the natural light EE photographic system, and also to employ the emitted light quantity (time and intensity) control type or the shutter time control type for the flash EE photographic system. Further-more, the invention may enable daylight synchro photography to be accomplished by a combination of these various systems, although the details thereof are omitted herein.

Further, in flash photography, it becomes possible to broaden the condition for an object to be photographed within the range of operation of a camera by employing a flash program system similar to a natural light program shutter system.

We claim:

1. A photographic camera having automatic exposure control means for controlling exposure during normal photography and flash photography, comprising:
 first diaphragm means for adjusting the phototaking aperture;
 photoelectric converter means for metering the brightness of an object to be photographed;
 second diaphragm means positioned in front of said converter means and mechanically linked to said first diaphragm means to provide an aperture for said converter means proportional to said phototaking aperture;
 electronic time limit means for effecting a time limiting operation in response to the output of said photoelectric converter means, said time limit means including a time limiting capacitor, a switching circuit changed over by the voltage of said capacitor, and an electromagnetic means for closing a shutter controlled by the output of said switching circuit;
 distance information means for providing an electronic output corresponding to the object distance;
 indicator means selectively connected with said photoelectric converter means or the distance information means by a change-over means hereinafter referred to and including an indicating member arranged to be displaced in response to an electric signal;

scanning means for scanning said indicating member, said scanning means being associated with said first diaphragm means to adjust the aperture thereof in accordance with the amount of displacement of said indicating member;

scale means carrying thereon indices for indicating F-number and shutter time by reference to said indicating member; and change-over means manually operable to provide flash photography and normal photography settings, which is selectively associated directly with the first diaphragm means and thereby with said second diaphragm means only in normal photography to adjust the respective apertures thereof manually to a selected value, whereby said converter means is conditioned to adjust the shutter time in accordance with the selected value of aperture of the first diaphragm means, said change-over means having electrical switching means for connecting said indicating means with said photoelectric converter means only before shutter release to show the shutter time value and disconnecting it therefrom after shutter release in normal photography and for providing connection of said indicating means with said distance information means and disconnecting it substantially from the converter means to provide a proper aperture value in accordance with an object distance through the scanning means in flash photography.

2. A photographic camera according to claim 1, wherein said scale means includes an F-number indicating scale, a shutter time indicating scale, and cover means for selectively shielding said two scales, said cover means being connected to said indicator means to selectively indicate one of said two scales.

3. A photographic camera according to claim 1, wherein said distance information means includes a variable resistance means variable in response to adjustment of the object distance, said resistance means being electrically connected with said indicator means through said change-over means.

4. A photographic camera according to claim 3, wherein said scale means includes an F-number indicating scale, a shutter time indicating scale, and cover means for selectively shielding said two scales, said cover means being mechanically connected to said change-over means so as to be selectively movable so that it is moved to a position for shielding said shutter time indicating scale when said electrical switching means of said change-over means has disconnected said indicator means from said converter means.

5. A photographic camera according to claim 3, wherein said distance information means includes an electrical switch member and said time limit means includes at least one resistor of a predetermined resistance value, said electrical switch member being connected so as to selectively change over said photoelectric converter means and said resistor into connection with said time limiting capacitor.

6. A photographic camera according to claim 3, wherein said indicator means includes a short-circuiting circuit and said scanning means includes a clamp member for clamping said indicating member of said indicator means, said short-circuiting circuit being provided with switch means adapted to close in response to shutter release, said short-circuiting circuit being short-circuited after said indicating member is clamped.

7. A photographic camera having automatic exposure control means for controlling exposure during normal photography and flash photography, comprising:

photoelectric converter means for metering the brightness of an object to be photographed;

electronic time limit means for effecting a time limiting operation in response to the output of said photoelectric converter means, said time limit means including a time limiting capacitor, a switching circuit changed over by the voltage of said capacitor, and an electromagnetic means for closing a shutter controlled by the output of said switching circuit;

distance information means for providing an electronic output corresponding to the object distance;

indicator means selectively connected with said photoelectric converter means or the distance information means by a change-over means hereinafter referred to and including an indicating member arranged to be displaced in response to an electrical signal from said photoelectric converter means;

scanning means for scanning said indicating member, said scanning means being associated with aperture means to adjust the opening thereof in accordance with the amount of displacement of said indicating member;

scale means including an F-number indicating scale, a shutter time indicating scale located normal to the F-number indicating scale, a light source for illuminating said F-number scale, and an optical system for optically overlapping said two scales, having a half mirror obliquely set between the F-number indicating scale and the shutter time indicating scale, and change-over means manaully operable to provide flash photography and normal photography settings, which is selectively associated directly with the aperture means only in normal photography to adjust the opening thereof manually to a selected value, said change-over means having electrical switching means for connecting said indicating means with said photoelectric converter means in normal photography, for providing connection of said indicating means with said distance information means in flash photography, and for enabling the operation of said light source of said scale means in flash photography.

* * * * *